(No Model.)
T. C. BELDING.
PLOW.
No. 305,995. Patented Sept. 30, 1884.
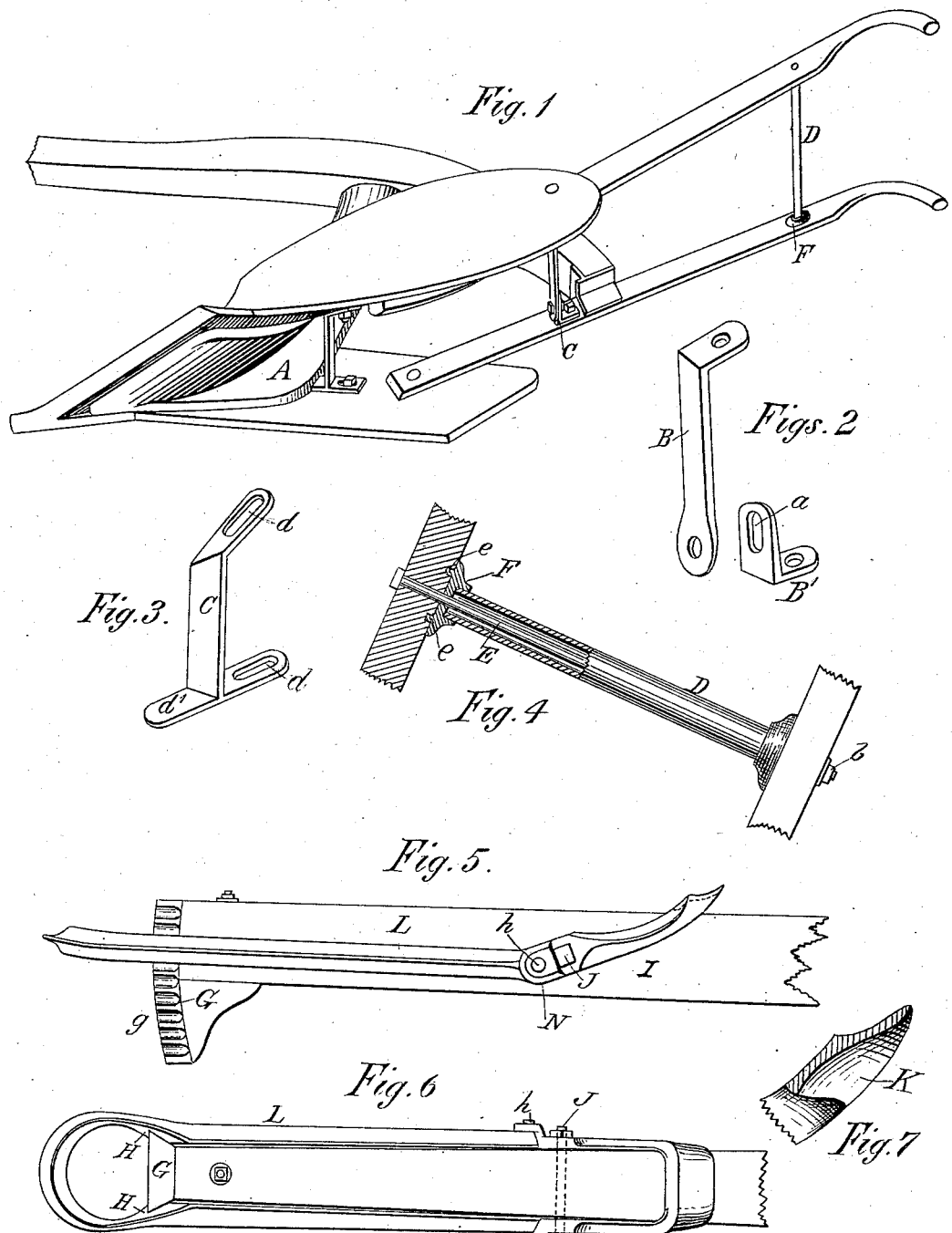

UNITED STATES PATENT OFFICE.

THOMAS C. BELDING, OF WAYNESBURG, ASSIGNOR OF ONE-HALF TO THOMAS C. SNYDER, OF CANTON, OHIO.

PLOW.

SPECIFICATION forming part of Letters Patent No. 305,995, dated September 30, 1884.

Application filed May 12, 1884. (No model.)

*To all whom it may concern:*

Be it known that I, THOMAS C. BELDING, a citizen of the United States, residing at Waynesburg, in the county of Stark and State of Ohio, have invented certain new and useful Improvements in Plows; and I do hereby declare that the following is a full, clear, and exact description of the same, reference being had to the annexed drawings, making a part of this specification, and to the letters and figures of reference marked thereon, in which—

Figure 1 is a perspective view showing plow on its side. Fig. 2 is a detached view of brace. Fig. 3 is a detached view of lower brace. Fig. 4 is a view of rung, showing section of one end. Fig. 5 is a side view of beam, showing clevis thereon. Fig. 6 is a top view of beam with clevis attached. Fig. 7 is a detached view of adjusting-lever.

The present invention has relation to the general construction of plows; and its nature consists in the construction and the combination of parts hereinafter particularly set forth.

In the accompanying drawings, A represents the post or standard, which may be formed in the ordinary manner for attaching the mold-board, landside, and share, the handles being attached to the plow as shown in Fig. 1.

The brace B is substantially of the form shown in Fig. 2, and is provided with the L-shaped portion B'. This L-shaped portion is provided with the slot a, which is for the purpose of adjusting the brace. The brace is placed in the position shown in Fig. 1, and is bolted or riveted to the handles. The bolt or rivet on the mold-board side passes through the mold-board and handle, thereby securely holding said parts together.

The L-shaped portion B', which is provided with the slot a, is wedge-shaped, as is also the portion of the brace B which fits against said L-shaped portion. The object of forming these parts wedge-shaped is, that they will be held firmly together by the clamping-bolt c, and will be less liable to slip out of place.

The lower brace, C, is substantially of the form shown in Fig. 3, and is provided with the slots d. One end of this brace is T-shaped, the opposite end being bent or curved so as to fit against the mold-board. The T end fits against the landside, the post or standard A being recessed, so as to receive the d' portion of this brace. This brace is formed as shown for the purpose of more securely bracing the mold-board and landside, and at the same time throws the brace proper so far under the post or standard that dirt will not fall in front of said brace, thereby preventing the plow from choking or becoming clogged, and may be adjusted to the proper position by means of the slots d.

The top or upper ends of the handles are braced by the rung D and its several parts. This rung is of the form shown in Figs. 1 and 4, and is formed hollow, as shown in Fig. 4, so as to admit the rod E. The ends of the rung D enter the collars F, as shown in the drawings, said collars being provided with the projections e, which enter the handles, as shown in Fig. 4, and are for the purpose of preventing the collars F from turning, all of said parts being held firmly together by the rod E.

To the outer end of the beam is attached the crown-head G, which is substantially of the form shown in Figs. 5 and 6, and is provided with the cogs g. This crown-head G is a segment of a circle of any desired diameter, the center of which is at the center of the pins h on the clevis when said clevis is in the position shown in Fig. 5. The cogs g are convexed on their upper sides, so that the rear ends of said cogs will be in line with N, which is the point the pins h reach when the operating-lever I is raised to disengage the projection H from the cogs g on the crown-head G. The object of forming the cogs g convexed is to admit an easy movement of the different parts of the clevis proper.

The clevis L is of the form shown in Figs. 5 and 6, and is provided with the projections H, which fit into the cogs g, as shown in Fig. 6. The rear end of the clevis L is provided with the pins h, which fit in the operating-lever I, as shown in Figs. 5 and 6.

The operating-lever I is of the form shown, and is attached to the beam by the bolt J. (Best seen in Fig. 6.) The rear part of this operating-lever is provided with the hand-hold K, as shown in Fig. 7. It will be seen that by an upward movement of the operating-lever I the clevis L will be drawn downward and back until it is disengaged from the cogs $g$, and the clevis can be raised or lowered, as desired, and again placed in proper position by a downward movement of said operating-lever and firmly locked.

To prevent the head on the bolt J from turning as the bolt is tightened, one side of the operating-lever is provided with the shoulder M, which fits against the bolt-head, as seen in Fig. 6.

I am aware that it is old to serrate a plow-beam at its clevis end and combine therewith a sliding clevis having a lock-tooth to engage with said serrations, and therefore lay no claim to such features, broadly.

Having now fully described my invention, what I claim as new, and desire to secure by Letters Patent, is—

1. The brace for the mold-board and land-side of a plow, composed of the bar C, having a T-head, one member of which is formed with an elongated slot, and provided at the other end with a deflected extension formed with an elongated slot, substantially as set forth.

2. The combination, with the operating-lever, of the clevis pivoted thereto, and adapted to be raised and lowered thereby, substantially as set forth.

3. The combination of the beam provided with the head G, formed with cogs $g$, the clevis L, formed with projections H, to engage with cogs $g$, and the lever I, pivoted to the beam, and having the clevis pivoted thereto, substantially as and for the purpose set forth.

In testimony that I claim the above I have hereunto subscribed my name in presence of two witnesses.

T. C. BELDING.

Witnesses:
WM. GLESSNER,
CHAS. H. JONES.